Sept. 21, 1937.  W. KOENIG  2,093,777
MOTOR GENERATOR FOR MEDIUM HIGH FREQUENCY ALTERNATING CURRENT
Original Filed April 6, 1932  5 Sheets-Sheet 2

INVENTOR
W. Koenig by
John D. Morgan
atty

Patented Sept. 21, 1937

2,093,777

UNITED STATES PATENT OFFICE 2,093,777

MOTOR GENERATOR FOR MEDIUM-HIGH FREQUENCY ALTERNATING CURRENT

Werner Koenig, Zug, Switzerland, assignor to Landis & Gyr, A.-G., Zug, Switzerland, a corporation of Switzerland Application April 6, 1932, Serial No. 603,560. Renewed December 9, 1936. In Switzerland April 11, 1931

11 Claims. (Cl. 171—119)

The present invention relates to controlled frequency alternating current generators and more particularly to such a motor-generator unit especially adapted for the actuation of resonant frequency controlled apparatus.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate typical embodiments of the invention, and together with the description, serve to explain the principles of the invention.

The several figures in the accompanying drawings are diagrammatic representations of the electrical circuits and component parts constituting the present illustrative embodiments of the invention.

Figures 1 to 7 illustrate modified embodiments in which the field windings of the motor and generator constituting the motor-generator group are connected in series, while

The present invention has for its object a provision of an alternating current generating unit particularly adapted for the generation of medium-high frequencies such as may be superimposed on an alternating current network for the actuation of frequency-controlled apparatus. The invention has for another object the provision of a generating unit of the kind referred to which is extremely reliable in operation and permits the output voltage to be automatically maintained within relatively narrow limits in an extremely simple manner. A further object is the provision of a generating unit for producing a constant medium-high frequency alternating voltage substantially regardless of load conditions.

In accordance with the present invention the voltage of the generated current is rendered independent of frequency by connecting the field windings of the generator and motor in series with the regulator therefor. The field windings of the motor and generator may be connected together either in series or in parallel with reference to each other, and it is also possible to render the generator voltage independent of the load in several ways. This may be effected through employing a compound winding placed in series with the armature winding of the motor, so that it may cooperate in a suitable manner either with the field winding of the motor or the field winding of the generator. Where the load is substantially constant, this independency of the voltage and load may be obtained by suitably adding or eliminating parts of the generator and motor field winding. With a parallel connected field winding it is also possible to obtain a generator in which the terminal voltage is independent of the load by connecting a compensating resistance in the exciter circuit of the motor generator group.

It will be understood that the foregoing general description and the following detailed description as well are exemplary and explanatory of the invention but are not restrictive thereof.

Figure 1:
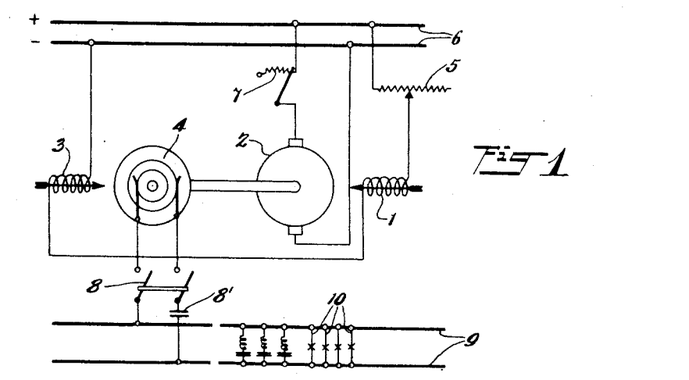

As illustratively shown in Figure 1 of the drawings, the field winding of motor 2 is connected in series with the field winding 3 of a generator 4 and an automatic frequency-adjusting regulating resistance 5 of conventional construction, current being supplied to these parts from direct current mains 6 at substantially constant voltage. The armature winding of motor 2 is also connected to the direct current main 6 through the starting resistance 7, and the output of generator 4 is supplied to the alternating current network 9 through main switch 8 and condenser 8'. At the desired points, resonant relays 10 to be actuated by the superimposed medium-high frequency current are connected to the network 9.

With such a motor generator unit, connected in the manner described, the frequency of the output current is independent of the terminal voltage of the generator due to the series connection of the field windings of the motor and generator.

This independence of the frequency and voltage may be explained as follows:

Let  $E_G$ = induced voltage of the generator
 $N$ = number of revolutions of the group
 $I_G$ = generator exciter current
 $I_M$ = motor exciter current
 $K, K_1, K_2$ = constants At a constant voltage, the number of revolutions of a shunt motor is inversely proportional to its excitation, and may be expressed as:—

$$I_M = \frac{K_1}{N}$$

The voltage of an alternating current generator is proportional to its excitation and to the number of revolutions, $$E_G = K_2 \cdot N \cdot I_G$$

and if $$I_G = I_M$$

then $$E_G = K_2 \cdot N \cdot I_M$$

And, if $$I_M = \frac{K_1}{N}$$

then $$E_G = K_2 \cdot N \cdot \frac{K_1}{N}$$

therefore $$E_G = K_2 \cdot K_1 = K$$

As is apparent from the final formula, by connecting the field windings in series and by suitably dimensioning the motor and generator, the generator will always retain the desired and constant induced voltage, independent of its speed of revolution. The desired frequency may therefore be obtained by varying the regulating resistance 5 without changing the induced voltage of the generator as the frequency changes.

The foregoing explanation can, of course, be applied only if the magnetic field fluxes in the motor and generator are proportional to the corresponding exciting currents, that is, in case the magnetizing curve of the cores is a straight line. In actual practice, however, this straight line magnetizing curve is never realized, particularly at the lower and higher speeds of revolution. The saturation of the motor field core necessitates the regulation of the automatic revolution regulator to a somewhat higher value than would be required if the core had a straight line magnetizing curve. Furthermore, with the generator, the saturation produces a smaller voltage than that corresponding to a definite excitation with a straight line magnetizing curve. Therefore, in order to maintain the generator voltage constant, it is necessary for the exciter current to be somewhat larger than the straight line curve magnetizing current and the effects of saturation on the motor and generator field cores compensate themselves to a greater or less extent. A complete compensation of this kind, can be obtained only if the motor and generator are identical in their magnetic construction.

Referring again to Figure 1, and assuming that the generator 4 is connected with the network 9 through main switch 8 and condenser 8', a large reduction in the voltage of the generator and of the motor speed results. The regulator 5 then attempts to maintain constant the motor speed by reducing the motor excitation. For this reason, increasing a load on the generator results in a reduction of the induced voltage of the generator. Thus the voltage drop in the armature windings of the generator is accompanied by a reduction of the exciter current and a drop in the self-induced generator voltage, all proportionally to the load, so that these factors can be eliminated through the provision of one or more compound windings in the motor generator group. With a constant sending load it is also possible to render the terminal voltage independent of the load of the generator by increasing or decreasing the field windings of the motor or generator.

Figure 2:
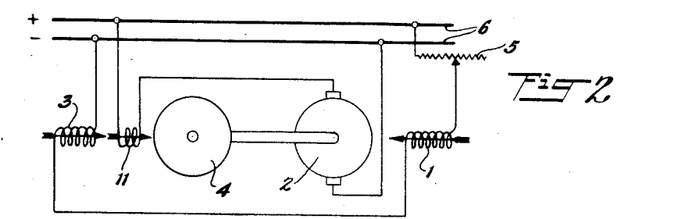
Figure 3:
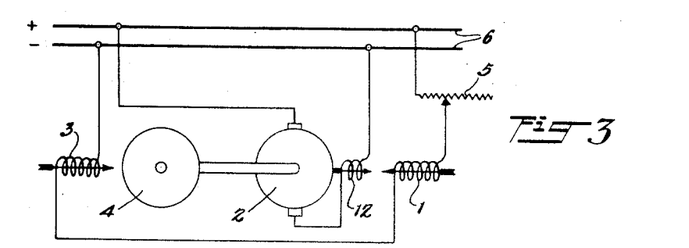
Figure 4:
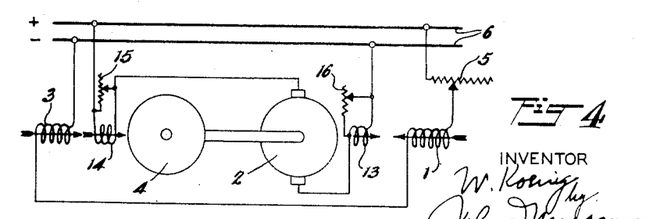

Figures 2 to 4 of the drawings illustrate typical embodiments of the invention in which the terminal voltage of the generator is rendered independent of load by compound windings. In each of these cases the compound windings are connected in series with the armature windings of the motor.

Figure 2 illustrates embodiments in which a super-compound winding 11 is in series with the armature winding of motor 2 and exerts an additive effect upon the exciter winding 3 to increase the field in which generator rotor 4 is rotated.

Whenever the load is applied to generator 4, regulator 5 will be moved to vary the exciter current and reduce it so far as necessary to maintain the speed of motor and generator revolution constant. The field portion of the super-compound winding 11 which is dependent upon the load, is so balanced that it will compensate for the drop in the exciter current as well as the voltage drop of the generator 4 as the generator is connected to the network and the load is varied thereby.

Instead of providing a super-compound winding 11, it is also possible to provide a similar winding on the motor, which would react oppositely to the exciter motor winding 1 to produce a negative super-compound winding. Figure 3 shows such a connection in which the negative compound winding 12 is in series with the armature winding of motor 2 and acts against the exciter winding 1. This negative compound winding is so chosen that at the time the generator 4 is connected to the network 9, and whenever the load on the motor 2 is increased, it will have a tendency to increase the number of revolutions of the motor generator unit. Regulator 5 counteracts this tendency through the increase of the shunt excitation, which compensates for the voltage drop in the armature winding of the generator.

By suitably proportioning the number of turns of the negative compound winding 12, the terminal voltage may be rendered independent of the load over a wide range.

Figure 4 illustrates a combination of the embodiments shown in Figures 2 and 3, with the motor compound winding 13 so proportioned that the speed of revolution of motor 2 will not be varied by a change in load on the generator. At a given frequency, the current in the exciter circuit will then be constant. The compound winding 14 for the generator 4 needs to be so chosen that it will compensate the voltage drop in the armature winding of generator 4. In this way, the balancing, after changes of load, occurs much quicker by reason of the fact that regulator 5 need not effect exact regulation. The compounding proportion is preferably made variable by means of regulating resistances 15 and 16 placed in parallel with respect to the compound windings 13 and 14 respectively.

It was assumed above, when explaining the action of compound connections of Figures 2 to 4, that the drop in the generator voltage was proportional to the load. This is true with respect to a motor generator unit having constant speed, but with a variable speed motor generator unit the generator voltage is also varied by changes in speed of revolution; in fact, medium-high and high frequency machines have a correspondingly high inductance drop which increases proportionately to the frequency.

In order to retain a constant terminal voltage, the compound windings should act more strongly at high frequency which purpose is actually filled by the embodiments shown in Figures 2 to 4 as will be explained in the following. In the embodiment shown in Figure 2 at 500 cycles and a definite load, the field winding 3 of generator 4 may furnish 95 per cent and the super-compound winding 11 five per cent of the total ampere-turns. At the same load, but double the frequency, the ampere-turns of the super-compound winding remain the same while those of the field winding 3 are reduced to one-half. Therefore the relative contribution of the super-compound winding for the total number of field-ampere-turns is twice as high at 1000 cycles than at 500 cycles. In certain cases the load of the generator remains approximately the same during the entire sending period and there exists only the unloaded or idle run and the constant sending load. In such a case, independence of the generator terminal voltage on load can be obtained without the use of compound windings, by increasing or decreasing the windings of the field coils of the motor and generator.

Figure 5:
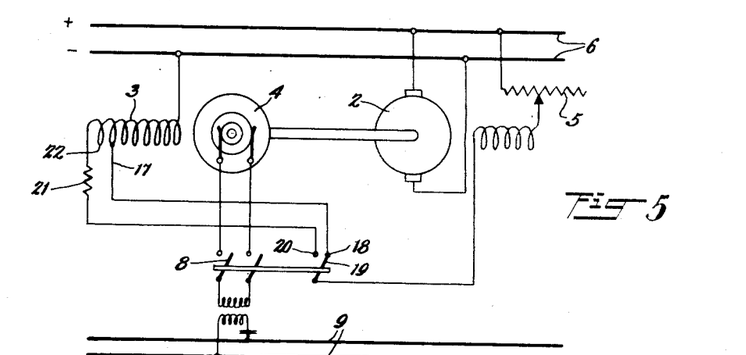
Figure 6:
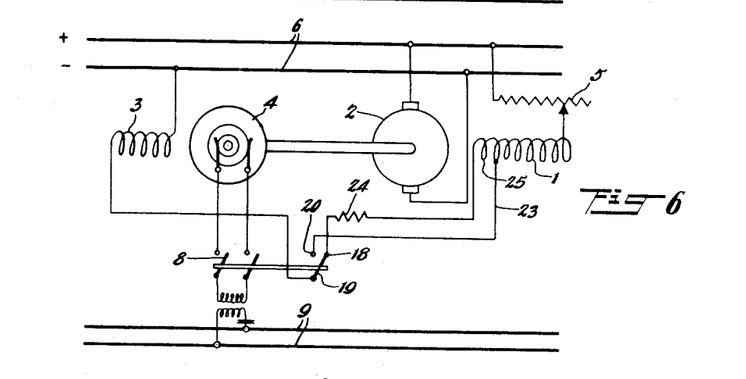
Figure 7:
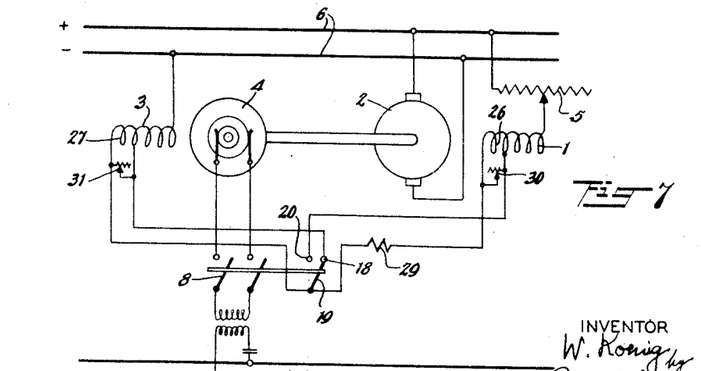

Figures 5 to 7 show embodiments of the kind just referred to, and in Figure 5, the field winding 3 of the generator 4 is tapped at 17 and connected to contact 18 of switch 19 which in turn is mechanically connected with switch 8. A second contact 20 of switch 19 is connected with one end of the field winding of generator 4 through a resistance 21. When generator 4 is not connected to the net 9, the winding 22 and resistance 21 are excluded from the exciter current circuit. As soon as main switch 8 connects generator 4 with the net-work 9, the portion 22 of winding 3 is connected with resistance 21 in the exciter current circuit.

The loading of the generator by connecting it to the net tends to reduce its speed of revolution which is supposed to remain constant, and it is therefore necessary to reduce the strength of the exciter current. This is normally effected automatically by the resistance regulator 5, but in the present embodiment is effected by resistance 21 and the ohmic resistance of the winding part 22 of field winding 3. The compensation of the voltage drop of generator 4 is produced by portion 22 of field winding 3 and the regulating resistance 5 need not be decreased.

In the exemplary embodiment shown in Figure 6, the contact 20 of switch 19 which is mechanically connected with main switch 8, is also connected with a tap 23 and contact 18 is connected through resistance 24 to one end of the exciter winding 1. With generator 4 disconnected, the entire field winding 1 of motor 2 and resistance 24 is now connected in the exciter current circuit.

As generator 4 is connected to network 9, the part 25 of the field winding 1 and resistance 24 are disconnected and therefore the speed of motor 2 remains constant. This reduction of the total resistance has the effect of compensating the voltage drop in generator 4, and, as previously, the resistance regulator 5 is not reduced.

Figure 7 shows a combination of the features disclosed in the embodiments of Figures 5 and 6. The mechanical interconnection of switches 19 and 8 causes the active number of turns of field winding 3 of the generator 4 to be increased and the turns of field winding 1 of motor 2 to be decreased as generator 4 is switched on to the network 9. It is also possible to obtain a very stable condition in this manner, as the regulator 5 is only loaded to a small extent at the time of switching of the generator 4.

When resistances 26 and 27 are not equal, a small change in resistance of the exciter circuit takes place as switch 19 is switched over, but this can be prevented by inserting a small additional resistance in the exciter current. In the embodiment of Figure 7 the resistance of part 27 of the field winding 3 is greater than the resistance of the corresponding part 26 of field winding 1 and the small resistance 29 is placed in series in line 28 to render the resistance of these two parts of the circuit equal. Under these conditions, the current in the exciter circuit does not undergo any change as the generator is switched from no load to load. Parts 26 and 27 of the motor and generator field windings 1 and 3 are chosen so that the portions of motor field winding part 26 which can be short-circuited is proportional to the field weakening necessary to maintain constant the speed of revolution of motor 2 and the part 27 of the generator winding equals the percentage voltage drop of generator 4.

As distinguished from the connections shown in Figs. 5 and 6, the complete unloading of the regulating resistance 5 at all frequencies can be obtained through the connections shown in Figure 7. A given load produces a particular percentage drop in the speed of revolution independent of the speed and dependent on the resistance of the armature winding of the motor. To compensate for this proportional drop, a proportional weakening of the motor excitation is necessary and must be constant at all frequencies. This condition is not obtained with the embodiments of Figures 5 and 6 as there the total resistance of the exciter current circuit is changed proportionally to frequency through the variations in resistance 5.

Increase of resistance by the insertion of windings 22 and resistance 21, as shown in Figure 5, produces a greater effect at lower frequencies than at higher frequencies. The same is also true of the embodiment of Figure 6, and accordingly the complete unloading of regulating resistance 5 as the load is switched on can be obtained at only a single frequency. Resistance 21 in Figure 5, as well as resistance 24 in Figure 6, is preferably so chosen that as the generator 4 is switched on to the net 9 at a medium-high sending frequency, the regulator 5 will remain at rest. At a higher frequency, regulator 5 has to compensate in one direction and at a higher frequency in the other direction.

In the embodiment shown in Figure 7, however, the exciter current remains unchanged as switch 19 is actuated. The change in the field of motor 2 and generator 4 is obtained through a variation in the number of active turns of the field windings 26 and 27 and the requirement for a change in field of constant proportion at all frequencies is thus produced so that the speed of revolution and terminal voltage of the generator remain unchanged at all frequencies without the use of regulating resistance 5, as the generator is shifted from no load to load.

In Figures 5 to 7, the field portion of the added field winding can be made variable by connecting resistances in parallel with the windings. As shown in Figure 7 variable resistances 30, 31 are shunted across the portions 26 and 27, respectively, of the field windings, and in order to provide for variations within wide limits, the windings 26 and 27 are preferably made larger than is necessary.

As distinguished from the embodiments shown in Figures 2 to 4, the proportional field strengthening as the load of the generator is suddenly increased, is not dependent upon the speed of revolution in the embodiments of Figures 5 to 7. These latter embodiments are therefore particularly suitable for operation in connection with tuned or resonant sending equipment.

In the embodiments of Figures 5 to 7 the inductive reactance of the superimposing transformers, as well as the inductive reactance of the generator are compensated by the reactance of the tuned condensers, and only the ohmic voltage drop remains to be compensated for. As this voltage drop is independent of frequency, this compensation may be fully obtained by a proportional strengthening of the field independently of frequency.

In the foregoing reference has been made only to the voltage drop of the generator, but it is to be understood that various arrangements for the compensation of the voltage drop can also be used to compensate for the voltage drop in the relays and in the network up to the relays. With resonant superimposing it is a question of the sum of the ohmic voltage drops which can be suitably compensated for through the connection with the tapped field windings. If the superimposing equipment is not tuned, it will then be advantageous to compensate the sum of the voltage drop in the impedances of the network, the superimposing transformer and the generator, by means of a compound connection.

All of the foregoing relates to embodiments in which the motor and generator field windings are connected in series. With such embodiments, the generator and motor must be designed with reference to each other and it is usually necessary to adjust the field windings of both or to shunt the one with the smaller current consumption.

In the embodiments now to be described, as illustrated in Figures 8 to 17, the field windings of the motor generator unit are not connected in series but are connected in parallel, so that the series connection of the field winding of the motor and of the generator with the regulator is retained. This produces the necessary condition that the excitation of the generator field coil must be varied inversely proportional to the frequency. The advantage of these parallel connections over the series connections of the field coils consists in that it is immaterial whether or not the current requirements of the field windings of the motor and generator are different and that with a normal shunt motor the common exciting circuit of the motor and of the generator can be connected to the same voltage as the motor armature. The parallel connections of the exciter windings of the motor generator unit permits the use of additional means to obtain an independence between frequency, load and terminal voltage over wide limits. These embodiments involve substantially the same corrective principles as were employed in connection with the embodiments of Figures 1 to 7.

Figure 8:
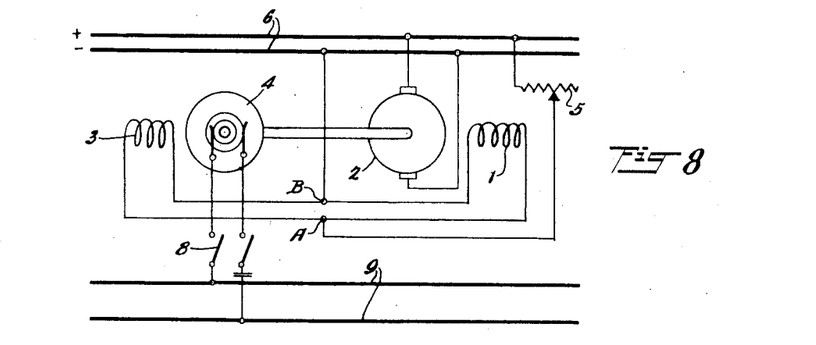
Figures 8 to 17 show other modified embodiments in which the field windings of the motor generator group are connected in parallel with respect to each other.

Figure 8, as Figure 1, refers to a connection in which the frequency is independent of the voltage at no load. When load is applied to the generator, the terminal voltage of the generator is reduced and the speed of revolution is similarly reduced. The drop in speed is automatically compensated for through an increase in the regulating resistance which weakens the field of motor 2. In the same way, the generator field is weakened, causing a further reduction of the terminal voltage of generator 4, and the total percentage drop on the generator terminals is thus equal to the sum of the internal voltage drop of the generator, as caused by the self-inductance and resistance of the armature winding of the generator 4 taken in connection with the percentage drop in speed.

Figure 9:
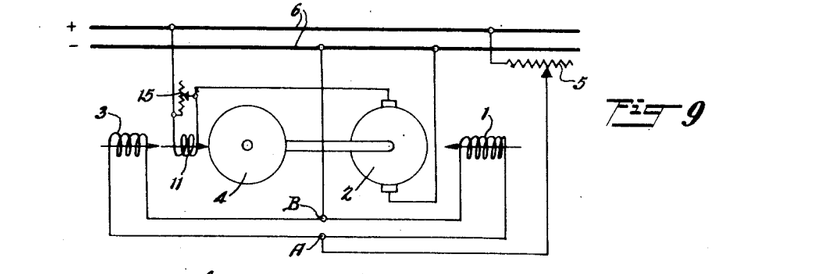
Figure 10:
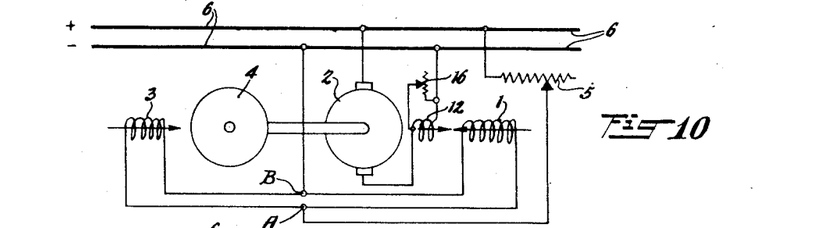
Figure 11:
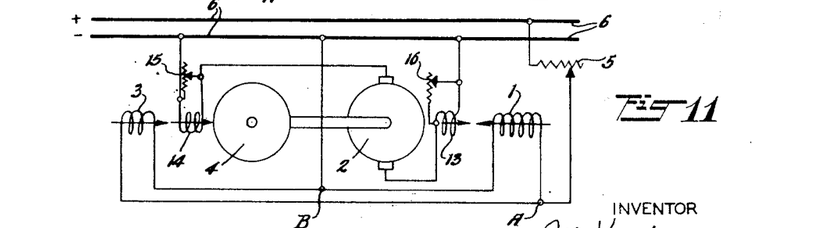

Figures 9 to 11 show connections in which the independence of load and terminal voltage is accomplished by compound windings, and in all these cases the compound windings are connected in series with the armature windings in the motor.

In Figure 9, as in Figure 2, the embodiment includes a super-compound winding 11, acting on the rotor of generator 4 and assisting the field winding 3 thereof, being in series with the armature winding of motor 2. The super-compound winding 11 is preferably so chosen that on loading the generator, it will not only compensate for the self-induced voltage drop of the generator, but also for the voltage drop which is created by the field weakening necessary to maintain the speed of revolution constant.

As already pointed out, the compound winding exerts a stronger effect at higher frequencies than at lower frequencies and is therefore especially advantageous at higher frequencies and also when non-tuned superimposing equipment is employed. In such a case, the voltage drops in the generator and superimposing transformer are predominately inductive and nearly proportional to the frequency. However, in any case, it is practically impossible to predict the terminal voltage drop with accuracy because it is primarily dependent upon the kind of the load. For this reason, it is advisable to provide a sufficient number of turns in the compound winding so that it will be possible to adjust the compounding proportion by means of a shunt resistance connected in parallel to the compound winding. Figure 9 shows such an adjustable resistance 15 connected in parallel with the compound winding 11.

Figure 10 illustrates an embodiment of the invention in which the super-compound winding is provided on motor 2 instead of generator 4. This winding opposes the field winding 1 of motor 2 and acts as a negative super-compound winding, by reason of which it is necessary to increase the shunt excitation through regulating resistance 5 when the load is applied, thereby preventing an increase in speed of the motor generator unit. Regulator 5 also acts indirectly as a voltage regulator to produce a strengthening of the generator excitation. It is preferable to provide a number of turns in the compound winding in excess of that required to make the compounding proportion adjustable by means of resistance 16.

Figure 11 illustrates an embodiment in which the features of Figures 9 and 10 are combined. By suitably dimensioning the super-compound windings 13 and 14 it is possible to cause the regulator to remain at rest at a medium-high frequency when the generator load is connected thereto. In this embodiment, there are also provided variable resistances 15 and 16 shunting the compound windings 13 and 14, respectively, for the establishment of the proper compounding ratio.

Figure 12:
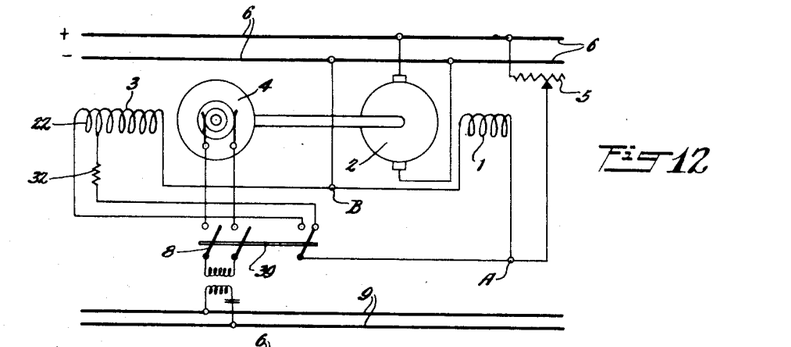
Figure 13:
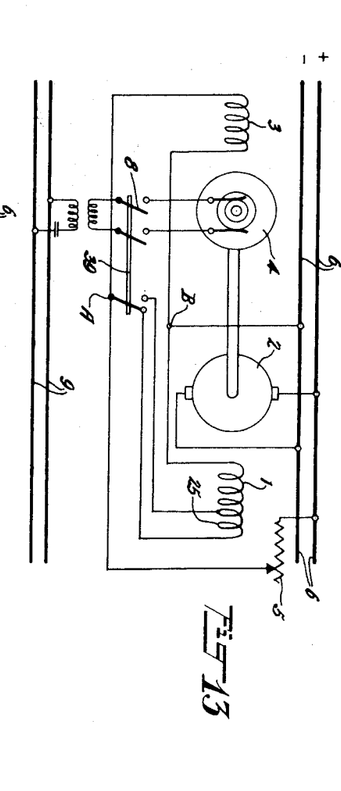
Figure 14:
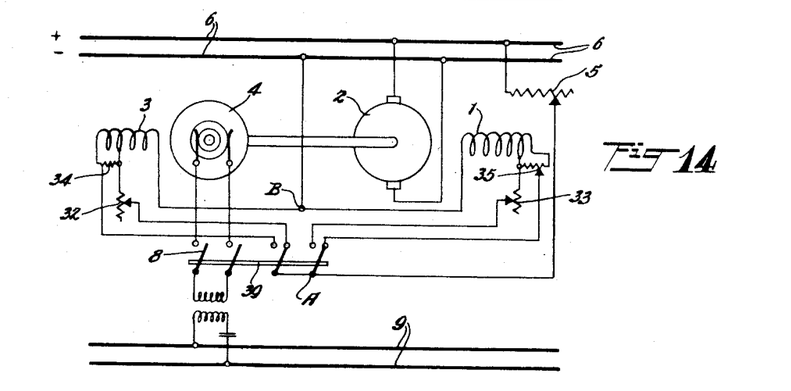

Figures 12 to 14 illustrate connections in which tapped field windings are used in place of compound windings. In these embodiments the switching over from the no-load condition of the field windings to the reduced windings of the motor and increased windings of the generator as the generator load is switched on, is automatically effected through a mechanical connection between the switching mechanisms. A small resistance is connected in circuit with each tap which is preferably equal to the resistance of the field winding parts to be disconnected and the total exciter current is thereby prevented from changing during the switching operation. If in Figure 12, for example, resistance 32 were made smaller than the resistance of the added field winding 22 of generator 4 under such conditions a decrease of the current would occur as the supplementary field winding 22 is switched into the main field winding 3. The increase of the total ampere-turns would then be smaller than the increase of the active number of turns. Furthermore, the number of ampere turns of the motor field would also be influenced. The resulting resistance of the parallel connected field windings would increase somewhat and the resulting current magnitude and voltage drop in the regulator would also decrease. Consequently the voltage on the motor field winding would increase, increasing the motor excitation. In addition, this influence would depend on the frequency and would be most pronounced at high frequencies as the greatest part of the adjustable resistance is then in circuit. If, however, resistance 32 is made equal to the resistance of the added field winding 22, the exciter current will remain unchanged as the generator load is switched on, thereby producing an independency of frequency.

The embodiments shown in Figures 12 to 14 act somewhat differently in certain points than the compound connections previously illustrated in Figs. 9 to 11. Compound connections give a correct compensation for the drop in speed as well as for the voltage drop at all loads, while with tapped connections, this will be true for only a particular definite load. Inasmuch as the connections illustrated in Figures 12 to 14 produce a change of ampere-turns which is exactly proportional to the turns added to the field winding, the result is an independence of the exciting currents and frequency.

Figure 14 illustrates a modification particularly adapted for producing this result just referred to and through the proper proportioning of the turns in the partial windings 26 and 27, the speed of revolution as well as the terminal voltage will remain constant at each frequency without increase of regulating resistance 5, as the generator 4 is connected to the net 9. Such an embodiment is especially suited for ohmic loads and also for distant control by means of tuned superimposing equipment and at relatively low frequencies on account of the compensation of the voltage drop which is independent of frequency.

In order to vary the proportion of the windings of the field coils of motor 2 and generator 4, it is also possible to shunt the auxiliary field windings. An ordinary shunt parallel to the partial windings would have very little effect as the current in the field windings would be increased by an increased shunt. A potentiometer connection 34, 35, as shown in Figure 14, can be used satisfactorily to accomplish this purpose.

Figure 15:
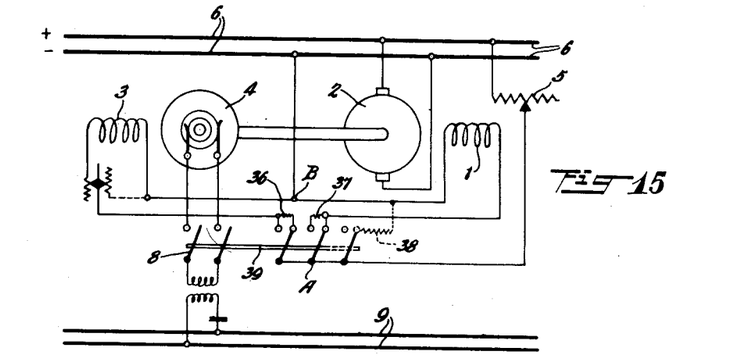

Figure 15 shows a connection for an entirely normal motor generator unit, with no provision made for compound windings nor auxiliary field windings. In order to compensate for the drop of speed and voltage, a compensating resistance 36 may be provided which is connected in advance with the generator field winding at no load, together with a compensating resistance 37 connected in series with the motor field winding by the placing of the load on the generator.

The compensating effect of this connection can also be rendered independent of frequency and for this purpose the switching over from the compensating switch 39 must be such that the potential between points A and B remains unchanged, i. e. the resulting resistance between points A and B must be the same before and after the switching occurs. In general, the resistances of the field windings 1 and 3 are not equal, nor are the compensating resistances 36, 37 equal, and this condition is not easily obtained without the provision of a variable resistance 38 between A and B. This variable resistance 38 is connected either at the no-load position or load position of the switch depending upon which position produces the greater resistance.

Figure 16:
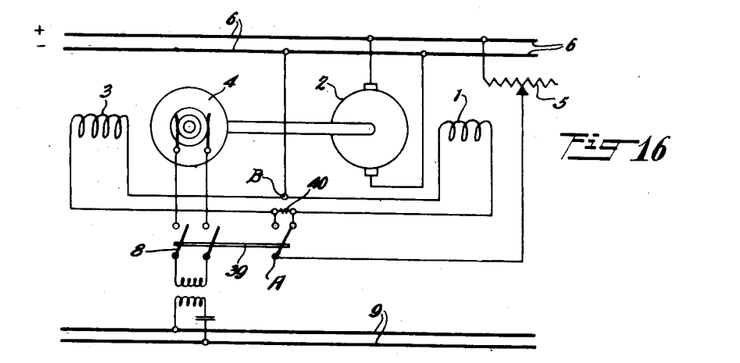

In the embodiment of Figure 16, a compensating resistance 40 is provided in the exciter circuit and which is switched ahead of the motor field winding 1 when the generator is loaded, and ahead of the generator field winding 3 at no load. This provides a single resistance in place of the two resistances 36, 37 as shown in Figure 15, and is applicable where the limits of accuracy are not too rigorous. This embodiment may also be employed in cases where the revolution speed and voltage drop proportionally as well as where the resistances of the field windings 1 and 3 are equal.

Figure 17:
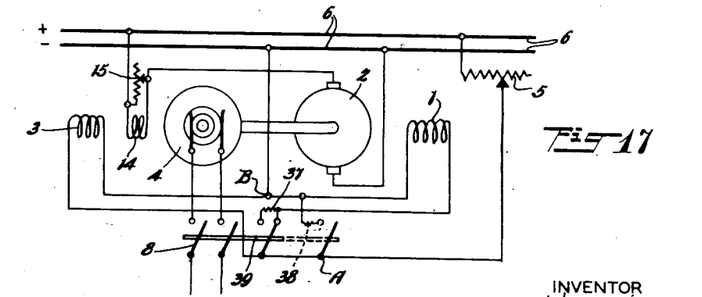

Figure 17 illustrates a further embodiment in which the various features of the combinations of Figures 9 to 15 are combined, thereby producing a voltage drop compensation at all frequencies and all loads if the load is primarily of an inductive character. The compensation for the decreased speed however can only be made independent either of the load or the frequency, and for distant control means independency of frequency is, of course, more important. The variations of speed are very small when the load is applied, so that they can be easily absorbed by the automatic regulator if the compensating resistance 37 is adjusted for an average load point.

The invention in its broader aspects is not limited to the specific mechanisms shown and described but departures may be made therefrom within the scope of the accompanying claims without departing from the principles of the invention and without sacrificing its chief advantages.

What I claim is:—

1. A motor generator for generating alternating current of medium-high controlled frequency including in combination an alternating current generator, a driving motor therefor, a regulating resistance in series with the field windings of the motor and generator whereby the field windings of both the motor and generator are subjected to identical regulation.

2. A motor generator for generating alternating current of medium-high controlled frequency including in combination an alternating current generator, a driving motor therefor, the field windings for said generator and motor being interconnected and a regulating resistance in series with the interconnected field windings of the motor and generator whereby the field windings of both the motor and generator are subjected to identical regulation.

3. A motor generator for generating alternating current of medium-high controlled frequency including in combination an alternating current generator, a driving motor therefor, field coils for the motor and generator, and a regulating resistance in series with the field coils, said field coils being connected in series to render the frequency independent of load.

4. A motor generator for generating alternating current of medium-high frequency including in combination an alternating current generator, a driving motor therefor, field coils for the motor and generator and a regulating resistance in series with the field coils, said field coils being connected in series and means for varying the strength of the field produced by said coils as load is applied to the generator.

5. A motor generator for generating alternating current of medium-high frequency including in combination an alternating current generator, a driving motor therefor, field coils for the motor and generator and a regulating resistance in series with the field coils, said field coils being interconnected and provided with opposed supplementary windings in series with the motor armature for varying the one of the total fields to compensate for load applied to the generator.

6. A motor generator for generating alternating current of medium-high frequency including in combination an alternating current generator, a driving motor therefor, field coils for the motor and generator and a regulating resistance in series with the field coils, said field coils being connected in parallel.

7. A motor generator for generating alternating current of medium-high frequency including in combination an alternating current generator, a driving motor therefor, field coils for the motor and generator and a regulating resistance in series with the field coils, said field coils being connected in parallel and opposed supplementary windings in series with the motor armature to produce a variable effect on the main fields.

8. A motor generator for generating alternating current of medium-high frequency including in combination an alternating current generator, a driving motor therefor, field coils for the motor and generator and a regulating resistance in series with the field coils, said field coils being connected in parallel, opposed supplementary windings in series with the motor armature adjacent one of said coils and means for varying the strength of field produced by said supplementary winding.

9. A motor generator for generating alternating current of medium high controlled frequency including in combination an alternating current generator, a driving motor therefor, a regulating resistance in series with the field windings of the motor and generator, and a supplementary winding in series with the motor armature, said supplementary winding serving to increase the generator field relatively to the motor field.

10. A motor generator for generating alternating current of medium high controlled frequency including in combination an alternating current generator, a driving motor therefor, said motor and generator having their field coils in parallel, a regulating resistance in series with the field windings of the motor and generator, and a supplementary winding in series with the motor armature, said supplementary winding serving to increase the generator field relatively to the motor field.

11. A motor generator for generating alternating current of medium high controlled frequency including in combination an alternating current generator, a driving motor therefor, a regulating resistance in series with the field windings of the motor and generator and a supplementary winding in series with the motor armature and opposing the motor field, said field windings being connected in parallel with each other, and resistances in series with said supplementary winding and one of said field coils.

WERNER KOENIG.